(12) United States Patent
Korneev

(10) Patent No.: US 10,351,079 B2
(45) Date of Patent: Jul. 16, 2019

(54) LICENSE PLATE TAG METHOD AND APPARATUS

(71) Applicant: Andrey Korneev, Arlington, TX (US)

(72) Inventor: Andrey Korneev, Arlington, TX (US)

( * ) Notice: Subject to any disclaimer, the term of this patent is extended or adjusted under 35 U.S.C. 154(b) by 0 days.

(21) Appl. No.: 14/967,296

(22) Filed: Dec. 12, 2015

(65) Prior Publication Data

US 2016/0152195 A1    Jun. 2, 2016

Related U.S. Application Data

(63) Continuation-in-part of application No. 14/755,970, filed on Jun. 30, 2015, now abandoned, which is a continuation-in-part of application No. 14/135,483, filed on Dec. 19, 2013, now Pat. No. 9,067,548.

(51) Int. Cl.
*B60R 13/10* (2006.01)

(52) U.S. Cl.
CPC ....... B60R 13/105 (2013.01); *Y10T 29/49947* (2015.01); *Y10T 156/10* (2015.01)

(58) Field of Classification Search
CPC ............................ G09F 2007/1895; G09F 3/12
USPC .................................. 40/200, 211, 121, 673
See application file for complete search history.

(56) References Cited

U.S. PATENT DOCUMENTS

| | | | |
|---|---|---|---|
| 1,403,302 A | 1/1922 | Dunn | |
| 3,016,642 A * | 1/1962 | Kowalski | A47G 1/10 40/784 |
| 3,230,653 A * | 1/1966 | Rice | B60R 13/105 248/206.5 |
| 3,535,808 A * | 10/1970 | Morrish | A47G 25/1428 223/92 |
| 4,177,305 A * | 12/1979 | Feingold | B44C 3/123 273/157 R |
| 5,149,571 A | 9/1992 | Croell | |
| 5,195,123 A | 3/1993 | Clement | |
| 5,623,776 A | 4/1997 | Lucier | |
| 5,819,449 A | 10/1998 | Molson | |
| 6,324,778 B1 | 12/2001 | Gall | |
| 6,385,876 B1 | 5/2002 | McKenzie | |
| 7,204,909 B1 | 4/2007 | Curiel et al. | |
| 9,440,597 B1 * | 9/2016 | Broadwell | B60R 13/105 |
| 2006/0075665 A1 * | 4/2006 | Lee | B60R 13/105 40/202 |
| 2006/0162196 A1 | 7/2006 | Kaiser | |
| 2007/0069089 A1 * | 3/2007 | Christopherson | F16B 47/00 248/205.5 |
| 2009/0100725 A1 | 4/2009 | Freeman | |
| 2012/0096748 A1 | 4/2012 | Volpe | |

(Continued)

*Primary Examiner* — Joanne Silbermann
(74) *Attorney, Agent, or Firm* — Law Office of Jeff Williams PLLC; J. Oliver Williams

(57) ABSTRACT

A method of attaching a vehicular identification member to a vehicle performed by obtaining a vehicle identification member having selectively identifying information regarding the vehicle. Locating the identification member adjacent a surface of the vehicle. Using an attachment member to secure the vehicle identification member to the vehicle. The attachment member is at least one of or both an adhesive layer and a fastener slot. The vehicle identification member may be secured through the application of force through a fastener within the slot and bonding via the removable adhesive layer to an interior or exterior surface.

14 Claims, 8 Drawing Sheets

(56) References Cited

U.S. PATENT DOCUMENTS

2013/0042966 A1 2/2013 Look
2014/0373403 A1 12/2014 Mendoza

* cited by examiner

LICENSE PLATE TAG METHOD AND APPARATUS

BACKGROUND

1. Field of the Invention

The present application relates generally to identification of automotive vehicles and, more particularly a method of installing and protecting identification material to a vehicle.

2. Description of Related Art

Motorized transportation has been around for decades. Such transportation includes boats, cars, trucks, all-terrain vehicles, motorcycles and so forth. Vehicles used on public lands (i.e. roads, paths, waterways) typically need to be registered with a particular government agency depending on location. When registered, a license or vehicle identification is prepared. Some licenses are temporary and others are permanent.

Temporary licenses are typically used for short durations and assist in the new sale, transfer of ownership of vehicles, and temporary use of a vehicle. Temporary licenses are typically made from a paper based material and protected in a thin plastic sleeve closed on three ends. The plastic sleeve is an attempt at preventing damage to the temporary license through environmental conditions and ensuring transparency for visual identification of the license. However, the sleeves often trap moisture inside which result in clouded or obstructed views of the license.

A temporary license may or may not come with holes for attaching to a vehicle. When holes are present, the holes are typically circular and set away from the edge. Therefore, to attach the license, the corresponding screws on the vehicle have to be removed completely. After aligning the license, the screws puncture the plastic sleeve and are re-threaded into the vehicle. A disadvantage of this method is the need to remove the screws. Removing the screws is time consuming and sometimes results in the loss or mishandling of screws. Additionally, the punctured sleeve may stretch, tear, or leak such that the head of the screw may not seal the opening. Moisture may then enter the sleeve and damage the license.

Although great strides have been made in attaching licenses to vehicles, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
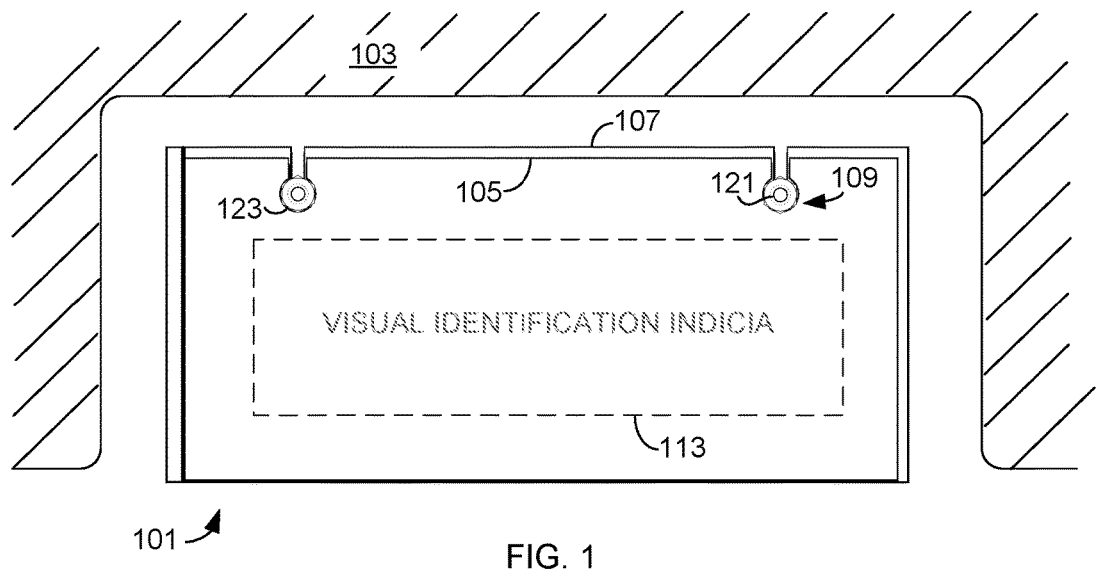
FIG. 1 is an identification system according to the preferred embodiment of the present application with fasteners.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring now to FIG. 1 in the drawings, an identification system is illustrated. Identification system 101 is configured to secure and display particular information with respect to a vehicle 103 to which it is attached. In the preferred embodiment, identification system 101 includes a vehicular identification member 105 and a protective member 107. Member 105 is configured to uniquely display and identifying information with respect to vehicle 103. Member 107 is configured to enclose member 107 in order to protect member 105 from external elements such as moisture, dirt, and debris. It is understood that other embodiments of system 101 may include member 105 only, wherein system 101 does not use protective member 107.

Information may be displayed on either, or both, of members 105 and 107. In the preferred embodiment, member 105 uniquely identifies vehicle 103 with a government issued identification tag. An example of member 105 is a license plate from an authorized government agency. It is known however that other forms of information may be presented within identification system 101, such information may allow for the owner/operator of vehicle 103 to customize an appearance or image with slogans, mottos, pictures, and so forth. A personal customized appearance or motto may be used by the owner/operator to also uniquely identify vehicle 103.

Figure 9:
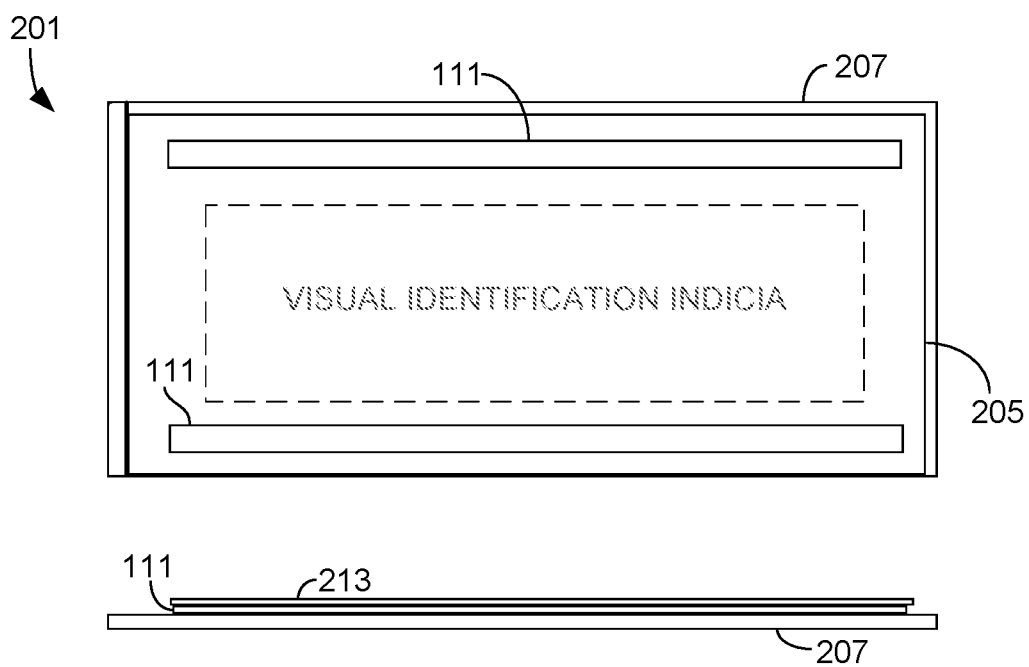
FIG. 9 is top and side views of an alternative embodiment of the identification system of FIG. 1.

Identification system 101 is selectively configured to be attached to vehicle 103 in at least one of two ways: 1) with the use of a fastener 109; and 2) with the use of an adhesive layer 111 (see FIG. 9). Each method of attaching system 101 to vehicle 103 is described herein in greater detail. It is understood that vehicle 103 may have one or more meanings. In the present application, vehicle 103 is associated with any motorized transportation device, including a car, truck, motorcycle, boat, all-terrain vehicle, aircraft, hovercraft, and/or recreational vehicle, for example.

Figure 2:
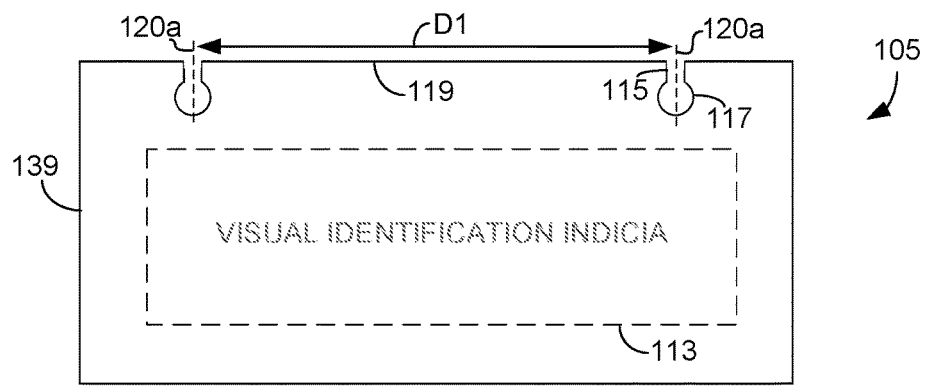
FIG. 2 is a vehicular identification member used in the system of FIG. 1.

Referring now also to FIG. 2 in the drawings, vehicular identification member 105 is illustrated. Member 105 is preferably a paper based material, such as: paper, card stock, poster board, construction paper, or other type of paper material. In other embodiments, member 105 may be a textile member, such as a fabric or canvass material; or a metallic material such as one containing aluminum or tin for example.

Member 105 includes a visual indicia section 113, a fastener slot 115, and a keyed aperture 117. Section 113 represents the portion of member 105 which contains the uniquely identifying information. It is understood that this area is not limited to that section depicted in FIG. 2. It is also understood that section 113 may in fact be one of a plurality of similar sections in other embodiments. The information displayed in section 113 is preferably printed material such as lettering and numerical identifiers. It is understood that other embodiments may include watermarks, pictorial and artistic markings or drawings, tinting, and other graphical displays. It is in section 113 that vehicle 103 is preferably uniquely identified.

Member 105 may be attached to vehicle 103 via fasteners 109 as seen in FIG. 1. Fasteners 109 are typically in threaded engagement with vehicle 103 at the time of installation of system 101. In order to ease installation of system 101, fastener slot 115 is punched through member 105 adjacent an edge 119. A hole punch device or other punching device with a designed bit may be used to punch slot 115. Slot 115 is a channel sized to pass on either side of a threaded shaft 121 of fastener 109. Slot 115 permits edge 119 to translate past shaft 121 between vehicle 103 and head 123 of fastener 109, all while fastener 109 remains in threaded engagement with vehicle 103. The width and length of slot 115 is selectively chosen depending on the type of vehicle 103 and fastener 109 used. Slot 115 may be no more than a selectively located cut in member 105. Where more than one slot 115 is used, the distance D between slots 115 may be selectively tailored to match that of vehicle 103. Although depicted wherein slot 115 has parallel edges, it is understood that the edges of slot 115 may be non-parallel and also may be oriented at non-perpendicular angles with respect to edge 119.

Figure 3:
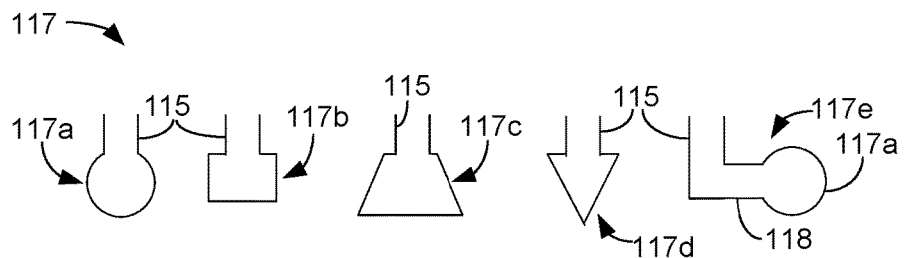
FIG. 3 is a plurality of keyed aperture shapes used in the system of FIG. 1.

Referring now also to FIG. 3 in the drawings, various designs of keyed apertures are illustrated. Keyed aperture 117 is configured to assist with alignment of member 105 in relation to head 123 and account for chamfers and fillet radiuses of fastener 109, and so forth. Keyed aperture 117 is punched through member 105 along a portion of slot 115 distal from edge 119. Much like slot 115, aperture 117 is formed merely by removing a portion of member 105. Keyed aperture 117 is not limited to any particular shape. FIG. 3 illustrates various shapes, such as: circular 117a, rectangular 117b, rhombus 117c, and triangle 117d. It is understood that the shape of aperture 117 may be selectively chosen based upon design constraints and preferences. The shapes illustrated in the figures are not meant to be limiting, but rather serve as an illustrative example of a selected few possible shapes. In other embodiments keyed aperture 117 may also include an additional slot 118 extending from slot 115 as seen with aperture 117e. In use, member 105 is punched with either slot 115 by a user or with slot 115 and keyed aperture 117. Slot 118 may also be punched. Slot 115, aperture 117, and slot 118 are configured to assist in the efficient installation of member 105 to vehicle 103.

Referring now also to FIGS. 4-7 in the drawings, protective member 107 is illustrated in various embodiments. Protective member 107 is a multilayered transparent article configured to permit an unobstructed view of member 105. Protective member 107 is configured to sealingly enclose member 105 to prevent exterior foreign substances from contacting member 105. In so doing, protective member 107 is configured to house member 105 by extending around and beyond all edges of member 105. In order to generate a seal around member 105, protective member is configured to accept lamination. In the preferred embodiment, member 107 is made from a laminating material, such that the application of heat forms a bond between opposing layers of member 107. An advantage of sealing member 105 within member 107 is the ability to eliminate the exposure to foreign substances which may lead to fogging of member 107, water damage to member 105, and tearing to member 107. The life span of system 101 is greatly increased through lamination of member 107. Although a heat induced laminate bond is preferred, it is understood that cold laminate bonding is also acceptable for generating the seal.

Figure 4:
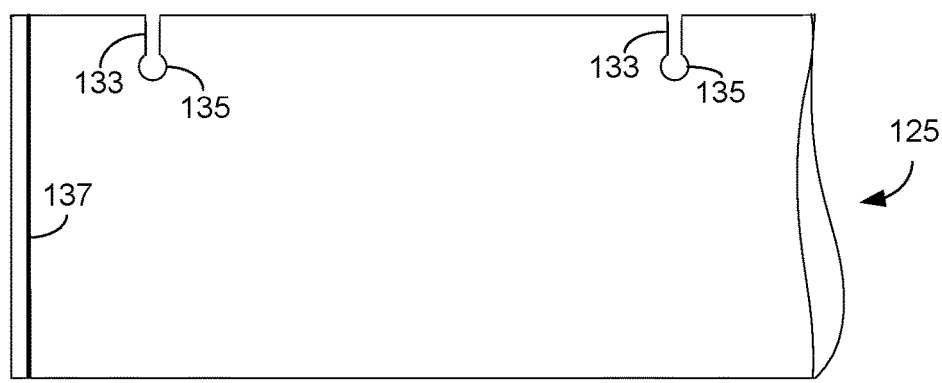
FIGS. 4-7 are examples of various embodiments of a protective member used to enclose the vehicular identification member of FIG. 2.
Figure 5:
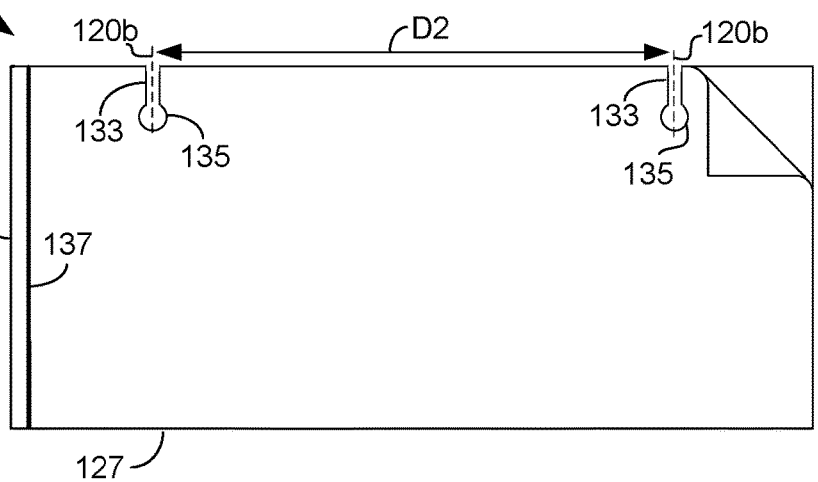
Figure 6:
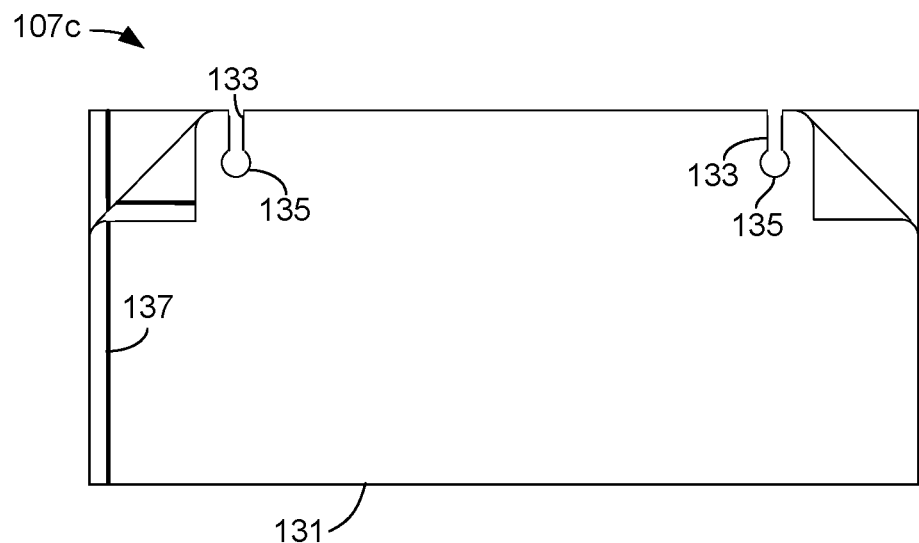

Member 107 is formed as a multilayered apparatus wherein member 105 is inserted between opposing layers. FIGS. 4-7 illustrate various embodiments and forms in which member 107 may exist, namely members 107a, 107b, 107c. In FIG. 4, member 107a is illustrated as a sleeve in which member 105 would be inserted within a singular open end 125. Each other end of member 107a is bonded together. In FIG. 5, member 107 is illustrated as having two bonded edges 127, 129. In FIG. 6, member 107c is illustrated as having a singular edge 131. Member 107c may form edge 131 by folding member 107c into equal sections, wherein edge 131 represents the fold. It should be understood that member 107 may be formed by two separate sheets in some embodiments as well. However, it is preferred that at least one edge of the opposing layers be bonded to simplify insertion and alignment of member 105.

In the preferred embodiment of member 107, corresponding slots 133 and keyed apertures 135 will be formed. Slot 133 will correspond to slot 115. Aperture 135 will correspond to aperture 117. The spacing distance D2 between a plurality of slots 133 and slots 115 are configured to match the spacing distance D1 in member 105 as measured from each slot's centerline 120a, 120b. Additionally, the sizing of slot 133 and aperture 135 is configured to be dimensionally smaller than the corresponding ones used in member 105. This is to ensure that member 107 seals around edges within slots 115 and aperture 117. For example, slot 133 is narrower than slot 115. Likewise the sizing of aperture 117 would be larger than that of aperture 135. By incorporating slots 115, 133 and optionally apertures 117, 135 into member 105 and 107, identification member 105 may be installed and attached to vehicle 103 without breaking the seal of member 107 through puncturing or tearing member 107. Furthermore, slots 115, 133 and optionally apertures 117, 135 permit system 101 to pass around shaft 121 of fastener 109, thereby avoiding the need to remove fasteners 109 from vehicle 103 during installation of system 101.

Slot 133 and aperture 135 are preferably preformed into member 107, thereby facilitating the user to pre-determine the type of slot 115 and aperture 117 as well as the spacing to be used in member 105. Because member 105 is punched separately from that of member 107, there arises a need to align member 105 within member 107. As seen if FIGS. 1 and 4-6, member 107 further includes an alignment marking 137. Marking 137 is configured to represent or identify a particular placement of an edge 139 of member 105 to ensure proper alignment of slot 115 with slot 135. Marking 137 is a tinting located along one or more layers of member 107. Marking 137 may be formed within member 107 or may be selectively added by a user to permit the fluctuation of vehicle 103 sizes and fluctuation of member 105 sizes.

Figure 7:
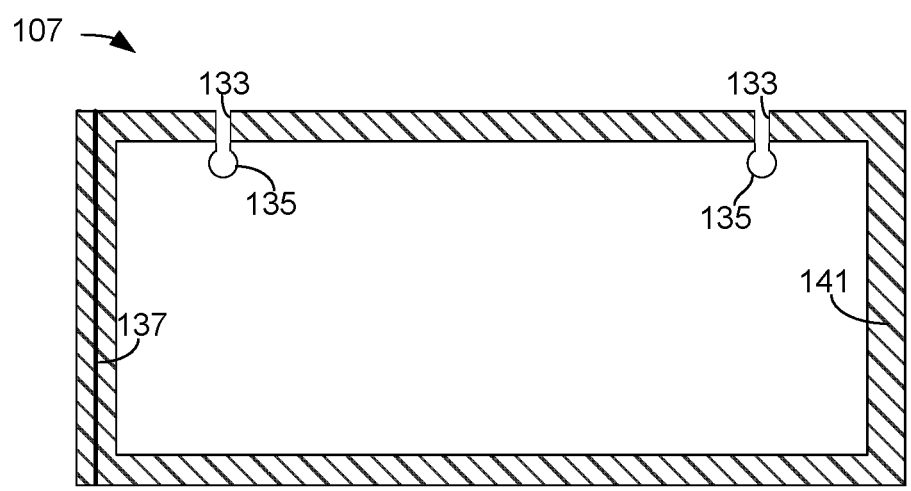

Although described as being transparent, member 107 may include selective amounts of tint or graphical indicia 141 apart from that of marking 137, as seen in FIG. 7. Indicia 141 is depicted as extending around the edges of member 107 so as not to obstruct the view of section 113. Indicia 141 may include tint, print, or graphics, to name a few. It is understood that other embodiments may permit the selective tinting or placement of indicia 141 across section 113 as long as the view of the information within section 113 is not obstructed. The use of indicia 141 and marking 137 is optionally included and operable with any of members 107a, 107b, 107c as well as any other form such as separate sheets described previously.

Figure 8:
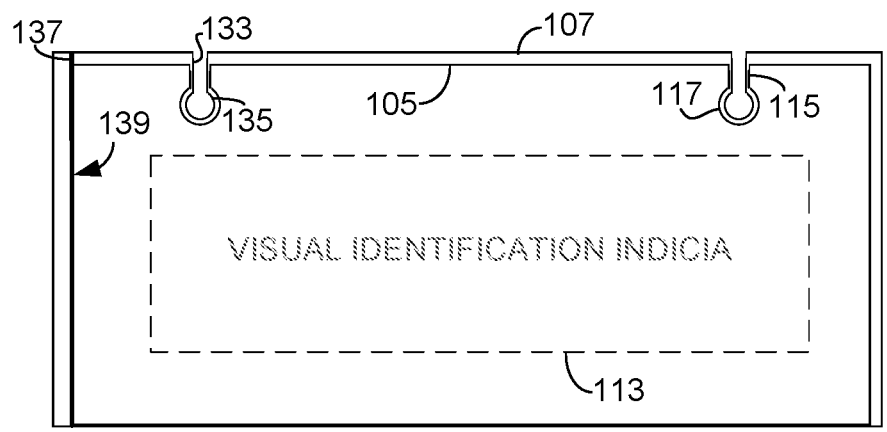
FIG. 8 is the identification system of FIG. 1 as seen without fasteners.

Referring now also to FIG. 8 in the drawings, system 101 is illustrated. In FIG. 8, member 105 is illustrated within and sealingly enclosed by member 107. Member 107 has undergone a laminating process to bind opposing layers of member 107 to one another around the edges of member 105, slot 115, and aperture 117. Marking 137 is shown as being aligned with edge 139 thereby aligning slots 115 and 117. Although indicia 141 are not illustrated, it is understood that indicia 141 may be selectively included.

System 101 may include one or more other types of attaching devices to assist in securing system 101 to vehicle 103. Examples of other attaching devices is the use of a removable adhesive or magnets.

Referring now also to FIG. 9 in the drawings, a top view and side view of an identification system 201 is illustrated. System 201 includes identification member 205 and protective member 207. Members 205 and 207 are similar in form and function to members 105 and 107 respectively. System 201 differs from system 101 in that member 207 does not need to include a slot or aperture similar to slot 133 or aperture 135 (slots are optional). Member 207 is configured for use on the inside of a vehicle, such as an inside surface of a glass window (i.e. a windshield or rear window). Therefore slots or apertures are not needed. The specific location of system 201 necessitates a different method of securing members 205 and 207 to the vehicle 103. Additionally, because system 201 is located within vehicle 103, identification member 205 is not exposed to the harmful outdoor environment, protective member 207 also does not need to be sealed closed.

Because the punching of slots and apertures are not necessarily performed in member 207, system 201 is configured to be secured to vehicle 103 via the use of a releasable adhesive. System 201 includes an adhesive layer 111 selectively applied to a single side of member 207. Because the front face of system 201 is adjacent the glass, adhesive layer 111 is ideally located along the front portion of protective layer 207. Each adhesive layer 111 includes a removable layer 213 configured to selectively peel away from adhesive layer 111 to permit the adhesive bonding of member 207 to the glass surface within vehicle 103.

Layer 111 may be applied to protective member 207 before or after inserting identification member 205 within protective member 207. It is understood that the use of lamination is not required for system 201 due to its location within vehicle 103. However, lamination is still optional and may be performed to help secure member 205 relative to member 207. Additionally, use of apertures and slots as seen in system 101 may still be optionally used. Situations may arise where system 201 needs to be relocated from within the vehicle to an external location. The use of slots and apertures may be useful. The slots and apertures may be pre-punched into member 207 or punched after use when the need arises.

Figure 10:
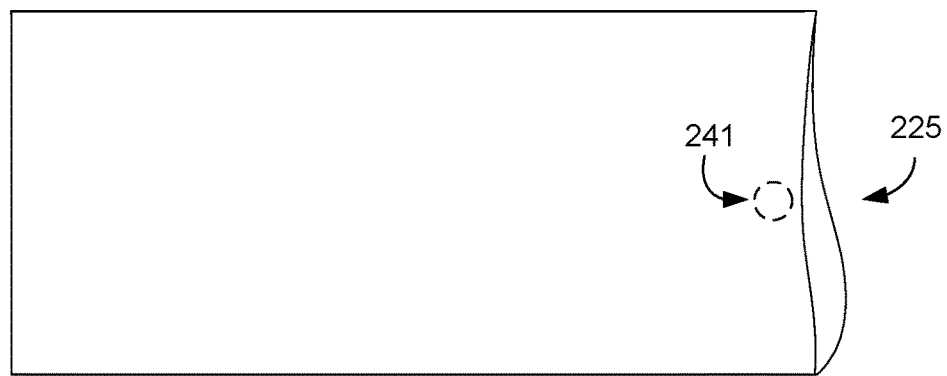
FIGS. 10-13 are examples of various embodiments of the protective member of FIG. 9.
Figure 11:
Figure 12:
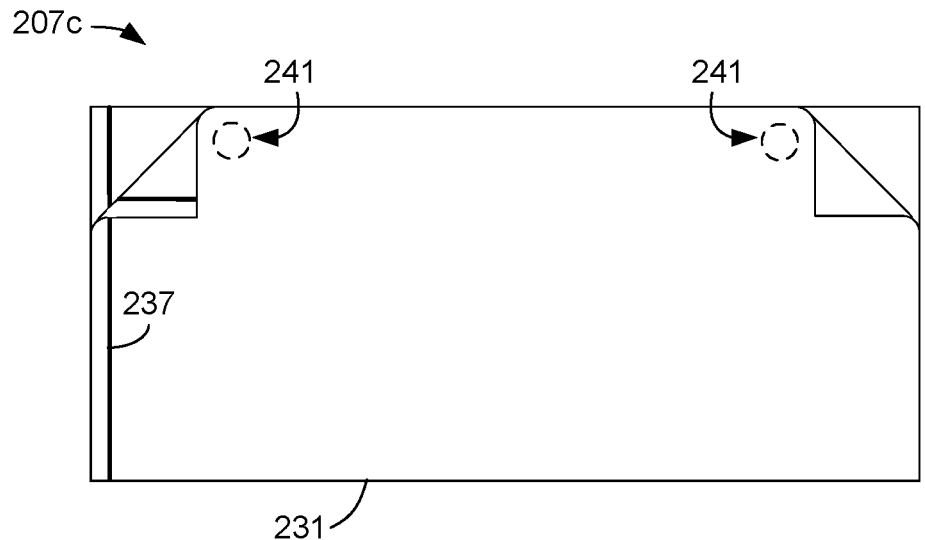

Referring now also to FIGS. 10-13 in the drawings, side views of exemplary embodiments of protective member 207 are illustrated. Member 207 is formed as a multilayered apparatus wherein member 205 is inserted between opposing layers. Protective member 207 is similar in form and function to that described with system 101 in FIGS. 4-7. Protective members 207a-d illustrate different embodiments and forms in which member 207 may exist. In FIG. 10, member 207a is illustrated as a sleeve in which member 205 would be inserted within a singular open end 225. The other three ends of member 207a are bonded together. In FIG. 11, member 207 is illustrated as having two bonded edges 227, 229. In FIG. 12, member 207c is illustrated as having a singular edge 231. Member 207c may form edge 231 by folding member 207c into equal sections, wherein edge 231 represents the fold. It should be understood that member 207 may be formed by two separate sheets in some embodiments as well. However, it is preferred that at least one edge of the opposing layers be bonded to simplify insertion and alignment of member 205.

As noted previously that system 201 is not necessarily exposed to lamination processes, a need arises to secure the loose ends of the layers of protective member 207 together to prevent identification member 205 from sliding or falling out when located in the window. As seen in FIGS. 10-12, an adhesive patch 241 is located on at least one interior surface of protective member 207. As seen in FIG. 10, patch 241 is located on a single inside surface and is configured to bond directly to the opposing surface of member 207. In FIG. 11, two opposing patches 241 are shown. Patches 241 may be configured to selectively bond to each other. Also, a protective layer 243 is shown more clearly overlaying patch 241 as a direct view of patch 241 is now visible. Layer 243 is configured to be selectively peeled away from the adhesive to permit bonding. This is similar in form and function to layers 111 and 213. It is preferred that patch 241 be located on the corner of member 207 that is not naturally closed or connected to the opposing layer of member 207. In FIG. 12, multiple patches 241 may be used at different locations. Any number of patches may be used and/or located in different areas. The purpose of patches 241 are to ensure the multiple layers of member 207 remain relatively together to prevent the undesired separation of member 205 from member 207.

Figure 13:
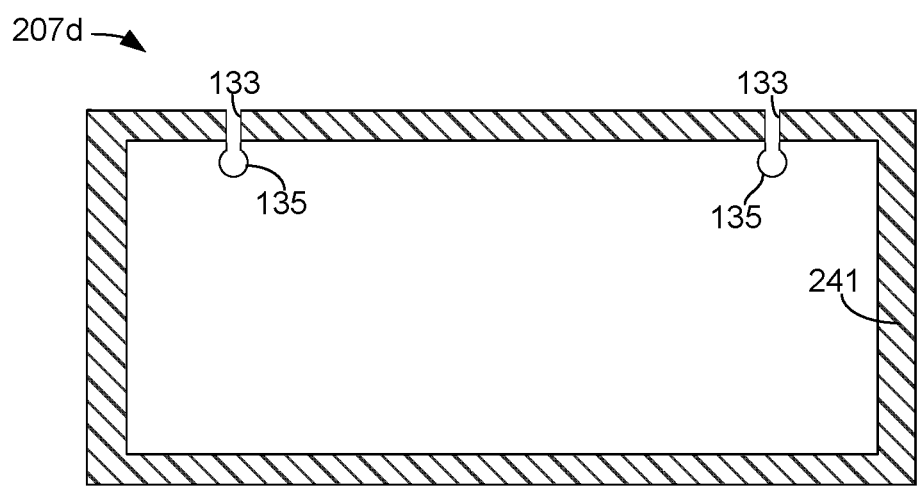

Although described as being transparent, member 207 may optionally include selective amounts of tint or graphical indicia 241 as well as alignment marking 237, as seen in FIGS. 12 and 13. Indicia 241 is depicted as extending around the edges of member 207 so as not to obstruct the view to member 205. Indicia 241 may include tint, print, or graphics, to name a few. It is understood that other embodiments may permit the selective tinting or placement of indicia 241 across any section as long as the view of the information on member 205 is not obstructed. The use of indicia 241 and marking 237 is optionally included and operable with any of members 207a-d as well as any other form such as separate sheets described previously.

As mentioned above, member 207 is similar in form and function to that of member 107. This includes the various forms illustrated in FIGS. 4-6. It is understood that adhesive layers 111 may be included with system 101 as described in FIGS. 1-8 above by selectively applying layers 111 before or after lamination. Additionally, it is understood that member 207 may selectively use slots 133 and apertures 135. These may be punched prior to initial use or after initial use when relocation of system 201 is required to an exterior mounting surface of vehicle 103.

During operation of attaching a vehicular identification member to a vehicle, a user obtains a vehicular identification member and applies printing or graphical information within section 113. Once printed or applied, the user punches one or more slots 115 and/or apertures 117 along an edge of the identification member. The user obtains a protective member 107 and positions the identification member within the protective member. The protective member is pre-punched to include a slot and/or slot and aperture. The slots and/or slot aperture punched by the user in the identification member is sized, selected, and spaced to correspond to the slots and/or slots and aperture pre-punched in the protective member. In order to facilitate alignment of the slots and/or apertures, the protective member includes an alignment marking. The user aligns an edge of the identification member with the alignment marking to align the slots and/or aperture of the identification member and protective member.

A user optionally may seal the identification member within the protective member by using a lamination process. The lamination process may include heat applied directly to the protective member or may be a cold process using an adhesively bonding sheet. The combined protective member and sealed identification member are then attached to the vehicle. To attach, fasteners in threaded engagement with the vehicle are retained in the vehicle. The fasteners may be loosened if necessary. System 101 is translated relative to the fasteners such that the shaft of the fastener passes within the slots of the protective member and identification member. The fastener is then rotated to apply a compressive force to the protective member, thereby securing the identification member to the vehicle.

Alternatively, use of an adhesive layer may be used to attach the identification system to the vehicle. After an identification member has been obtained and the information is printed or attached to the indicia section 113, the identification member is positioned within a protective member 207. The protective member may be optionally sealed. Adhesive patches are exposed and bonded to an opposing layer of member 207 in order to secure member 205 within member 207. The adhesive layer 211 is then applied to a surface of member 207 is not already incorporated thereon. The removable layer is removed to permit the bonding and locating of system 201 adjacent a glass window of the vehicle. If relocation is necessary, slots and apertures may be punched into member 207 for mounting externally to the vehicle.

Figure 14:
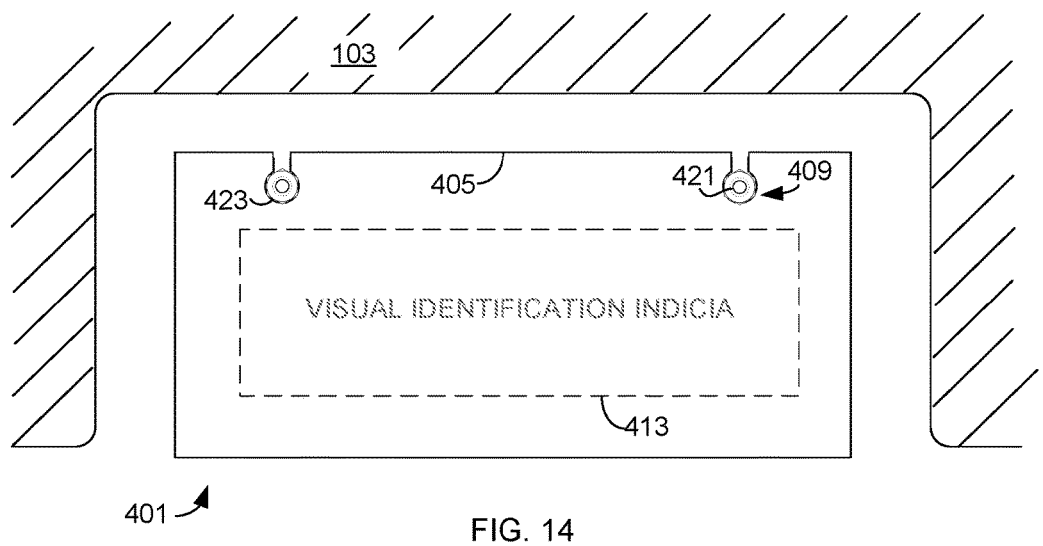
FIGS. 14-16 are an exemplary embodiment of the identification system of FIG. 1.
Figure 15:
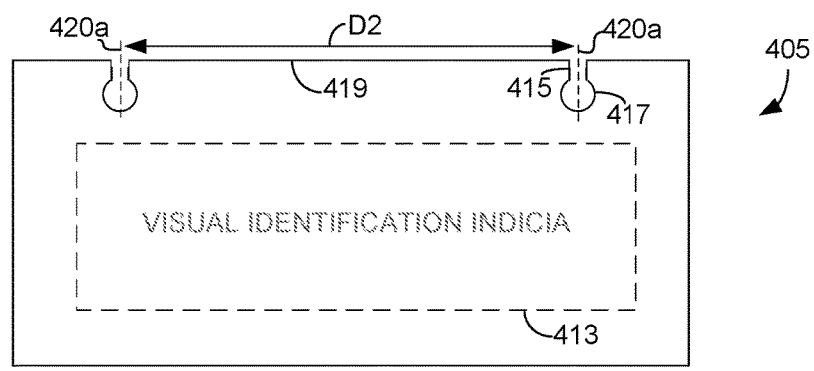
Figure 16:
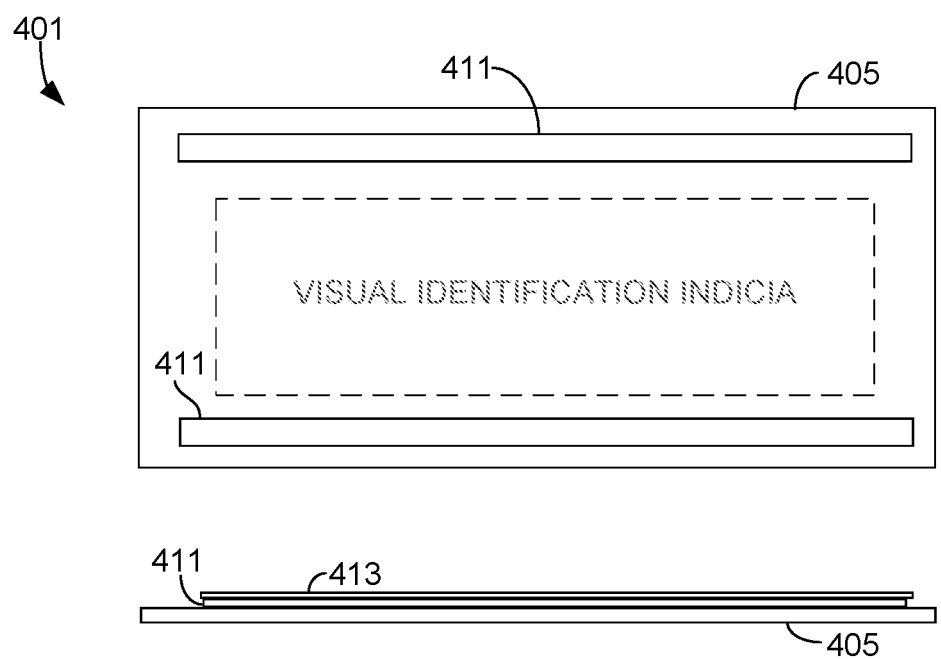

As stated previously, another embodiment of system 101 includes member 105 only, and does not use member 107. FIGS. 14-16 illustrate system 401. System 401 includes identification member 405. Member 405 is similar in form and function to that of member 105 and includes all the previously identified features of member 105, including the use of the slots 117 and visual identification indicia 117 specifically. Identification system 401 is selectively configured to be attached to vehicle 103 in at least one of two ways: 1) with the use of a fastener 109; and 2) with the use of an adhesive layer 111. Each method of attaching system 401 to vehicle 103 is described herein in greater detail.

Referring now also to FIG. 15 in the drawings, vehicular identification member 405 is illustrated. Member 405 is preferably a paper based material, such as: paper, card stock, poster board, construction paper, or other type of paper material. In other embodiments, member 405 may be a textile member, such as a fabric or canvass material; or a metallic material such as one containing aluminum or tin for example.

Member 405 includes a visual indicia section 413, a fastener slot 415, and a keyed aperture 417. Section 413 represents the portion of member 405 which contains the uniquely identifying information. It is understood that this area is not limited to that section depicted in FIG. 15. It is also understood that section 413 may in fact be one of a plurality of similar sections in other embodiments. The information displayed in section 413 is preferably printed material such as lettering and numerical identifiers. It is understood that other embodiments may include watermarks, pictorial and artistic markings or drawings, tinting, and other graphical displays. It is in section 413 that vehicle 103 is preferably uniquely identified.

Member 405 may be attached to vehicle 103 through one or more attachment members. Attachment members may be slots 415 with an accompanying fastener 409, and/or adhesive layer 411 (see FIG. 16). The use of fasteners 409 are seen in FIG. 14. Fasteners 409 are typically in threaded engagement with vehicle 103 at the time of installation of system 401. In order to ease installation of system 401, fastener slot 415 is punched through member 405 adjacent an edge 419. A hole punch device or other punching device with a designed bit may be used to punch slot 415. Slot 415 is a channel sized to pass on either side of a threaded shaft 421 of fastener 409. Slot 415 permits edge 419 to translate past shaft 421 between vehicle 103 and head 423 of fastener 409, all while fastener 409 remains in threaded engagement with vehicle 103. The width and length of slot 415 is selectively chosen depending on the type of vehicle 103 and fastener 409 used. Slot 415 may be no more than a selectively located cut in member 405. Where more than one slot 415 is used, the distance D2 between slots 415 may be selectively tailored to match that of vehicle 103. Although depicted wherein slot 415 has parallel edges, it is understood that the edges of slot 415 may be non-parallel and also may be oriented at non-perpendicular angles with respect to edge 419. The various orientations of the slot edges are discussed in detail in FIG. 3.

Member 405 is configured for use with an adhesive layer for application onto a portion of vehicle 103. Ideally this is thought best to occur on the inside of a vehicle, such as an inside surface of a glass window (i.e. a windshield or rear window), but it is contemplated that the adhesive layer may secure member 405 to an outer surface of the vehicle (i.e. body panel or window). Therefore slots or apertures are not needed but may still be included, wherein member 105 includes either or both of slots 417 and adhesive layer 411. When used internally within vehicle 103, the specific location of system 401 necessitates a different method of securing member 405 to vehicle 103.

System 401 is also configured to be secured to vehicle 103 via the use of a releasable adhesive. System 401 includes an adhesive layer 411 selectively applied to a single side of member 405. Adhesive layer 411 is located along either the front portion or back portion of member 405. Each adhesive layer 411 includes a removable layer 413 configured to selectively peel away from adhesive layer 411 to permit the adhesive bonding of member 405 to vehicle 103.

It is understood that the use of apertures and slots as seen in system 401 may still be optionally used layer 411. Situations may arise where system 401 needs to be relocated between an external location and an internal location. Additionally, slots 415 and fasteners 409 may be used simultaneously with adhesive layer 411.

The current application has many advantages over the prior art including the following: (1) increased durability; (2) simplified installation; (3) increasing the visibility of the identification member by preventing exposure to external elements; (4) interior and exterior mounting capability; and (5) optional use of slots, apertures, and adhesive layering.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. An identification system, comprising:
   a vehicle having a fastener;
   a vehicular identification member configured to uniquely identify the vehicle, the vehicular identification member being formed from a paper based material;
   a first fastener slot punched through the vehicular identification member and configured to couple the vehicular identification member directly to the vehicle, the first fastener slot includes parallel edges and is perpendicular to a top edge of the vehicular identification member, the first fastener slot passes through the top edge and inward to a first keyed aperture within the vehicular identification member;
   wherein the vehicular identification member is directly installed on the exterior of the vehicle such that the slot permits the passage of the fastener to pass from the top edge into the first keyed aperture without removal of the fastener, the slot of the vehicular identification member configured to flex around the fastener.

2. The identification system of claim 1, wherein the vehicular identification member includes visual indicia along a surface of the vehicular identification member, the surface also including the first fastener slot and the first keyed aperture, the visual indicia including at least one of a watermark, print lettering, a marking, and a numerical identifier.

3. The identification system of claim 1, further comprising:
   an adhesive layer bonded to a surface of the vehicular identification member, the adhesive layer is configured to secure the vehicular identification member to a surface of the vehicle to permit the vehicular identification member to be viewable from the exterior of the vehicle.

4. The identification system of claim 3, wherein the adhesive layer is transparent.

5. The identification system of claim 3, wherein the adhesive layer further comprises:
   a removable layer configured to selectively peel away from the adhesive layer to permit the adhesive bonding of a protective member to the vehicle.

6. The identification system of claim 1, wherein the first fastener slot is selectively sized and configured to pass around a fastener in threaded engagement with the vehicle, so as to permit the vehicular identification member to be secured to the vehicle by the application of force from the fastener.

7. The identification system of claim 1, wherein the first fastener slot is a cut in the material.

8. A method of attaching a vehicular identification member to a vehicle having a fastener, comprising:
   obtaining the vehicular identification member, the vehicular identification member being formed from a paper based material, the vehicular identification member having a first fastener slot punched through the vehicular identification member and configured to couple the vehicular identification member directly to the vehicle, the first fastener slot includes parallel edges and is perpendicular to a top edge of the vehicular identification member, the first fastener slot passes through the top edge and inward to a first keyed aperture within the vehicular identification member; and
   attaching the vehicular identification member directly to the vehicle by passing the first fastener slot of the vehicular identification member around the fastener coupled to the vehicle, the fastener passing through the first fastener slot and into the first keyed aperture, the first fastener slot of the vehicular identification member configured to flex around the fastener.

9. The method of claim 8, wherein the vehicular identification member includes visual indicia including at least one of a tint, print lettering, a marking, and a numerical identifier.

10. The method of claim 8, further comprising:
    translating the vehicular identification member around the fasteners in threaded engagement with the vehicle; and
    rotating the fasteners to apply a compressive force to the vehicular identification member, thereby securing the vehicular identification member directly to the vehicle.

11. The method of claim 8, further comprising:
    forming the first fastener slot along the top edge of the vehicular identification member.

12. The method of claim 11, wherein the first fastener slot is selectively sized and configured to pass around the fastener in threaded engagement with the vehicle, so as to permit the vehicular identification member to be secured to the vehicle.

13. The method of claim 8, further comprising:
    adhering the vehicular identification member to the vehicle by locating a removable adhesive between them.

14. The method of claim 13, wherein both the first fastener slot and the removable adhesive are simultaneously used to secure the vehicular identification member to the vehicle.

* * * * *